United States Patent
Wang et al.

(10) Patent No.: US 8,241,782 B2
(45) Date of Patent: Aug. 14, 2012

(54) BATTERY COVER AND PORTABLE ELECTRONIC DEVICE USING THE SAME

(75) Inventors: Jun Wang, Shenzhen (CN); Hsiao-Hua Tu, Taipei Hsien (TW); Gang Yang, Shenzhen (CN); Wen-Wei Song, Shenzhen (CN); Ying-Zhuo Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 835 days.

(21) Appl. No.: 12/332,535

(22) Filed: Dec. 11, 2008

(65) Prior Publication Data

US 2009/0239135 A1    Sep. 24, 2009

(30) Foreign Application Priority Data

Mar. 18, 2008 (CN) .......................... 2008 1 0300621

(51) Int. Cl.
*H01M 2/08* (2006.01)
*H01M 2/10* (2006.01)

(52) U.S. Cl. ........................................ 429/175; 429/100
(58) Field of Classification Search .................. 429/163, 429/175, 96–100
See application file for complete search history.

(56) References Cited

U.S. PATENT DOCUMENTS
7,261,973 B2 * 8/2007 Tu et al. ........................ 429/100

FOREIGN PATENT DOCUMENTS
CN    2689464 Y    3/2005

* cited by examiner

*Primary Examiner* — Ula C. Ruddock
*Assistant Examiner* — Thomas H. Parsons
(74) *Attorney, Agent, or Firm* — Altis Law Group, Inc.

(57) ABSTRACT

A battery cover which detachably mounted on a portable electronic device to protect the battery of the portable electronic device. The battery cover includes a main cover and a sliding cover, the sliding cover is slidably mounted on the main cover. Two opposite ends of the main cover and the sliding cover each includes at least one tab or projection protruding there from respectively. The battery cover has a simple structure, and is easy for operating. The invention also includes a portable electronic device using the battery cover.

11 Claims, 6 Drawing Sheets

BATTERY COVER AND PORTABLE ELECTRONIC DEVICE USING THE SAME

BACKGROUND

1. Technical Field

The disclosure generally relates to a battery cover, and particularly to a battery cover for use in a portable electronic device.

2. Discussion of the Related Art

With the development of wireless communication and information processing technologies, portable electronic devices such as mobile phones and personal digital assistants (PDAs) are now in widespread use, and consumers may now enjoy the full convenience of high technology products almost anytime and anywhere.

Batteries are widely used in these portable electronic devices and, a battery cover is typically used to secure the battery within the portable electronic device. However, existing battery covers are hard to be disassembled or installed and they tend to be damaged as a result.

Therefore, there is room for improvement within the art.

BRIEF DESCRIPTION OF THE DRAWING

Many aspects of the exemplary battery cover can be better understood with reference to the following drawings. The components in the drawings are not necessarily drawn to scale, the emphasis instead being placed upon clearly illustrating the principles of the exemplary battery cover. Moreover, in the drawings, like reference numerals designate corresponding parts throughout the several views, in which.

DETAILED DESCRIPTION OF THE EMBODIMENT

Figure 1:
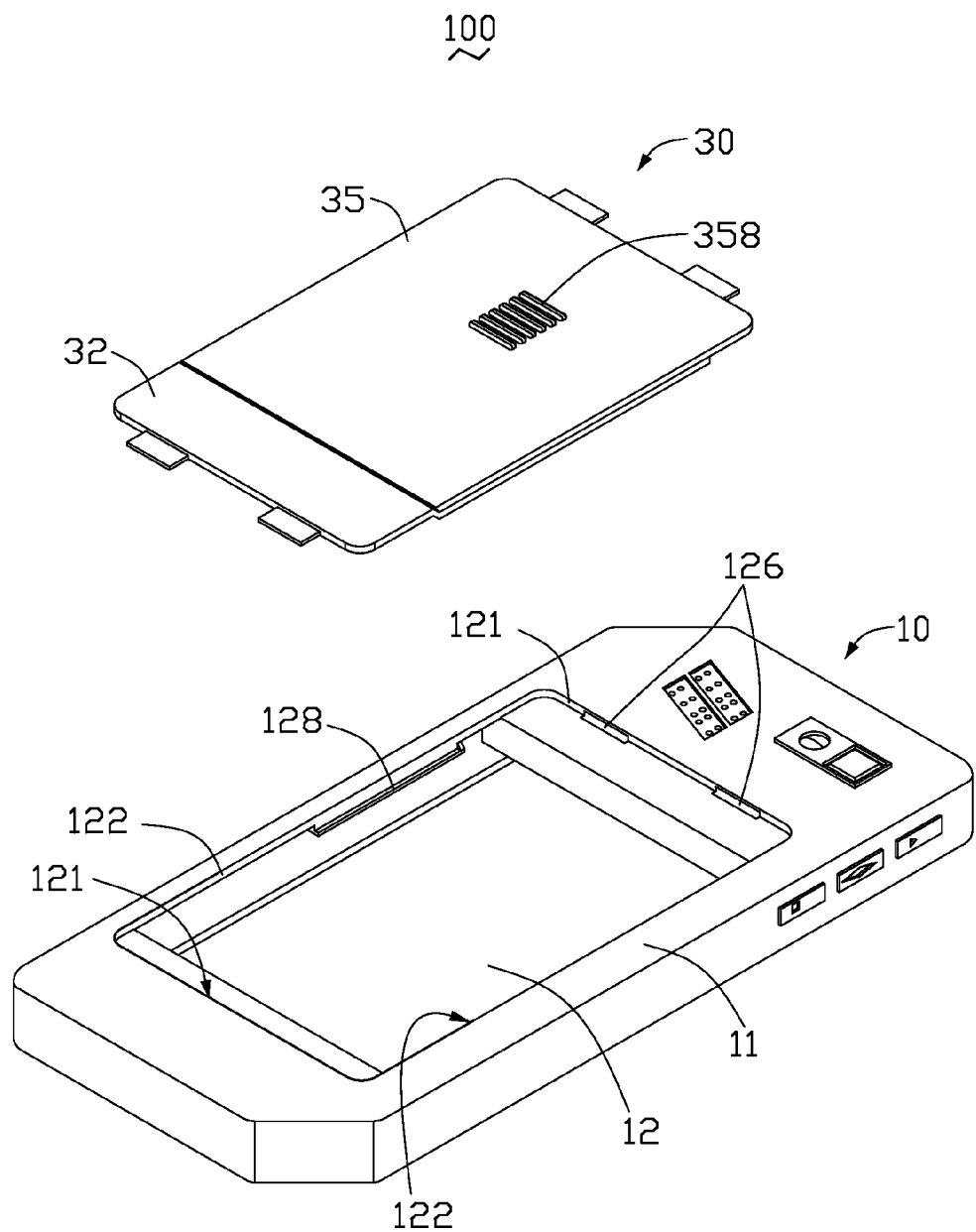
FIG. 1 shows an exploded, schematic view of a portable electronic device, with a battery cover detached therefrom.

An exemplary portable electronic device can be a mobile phone, PDA, camera, etc. Referring now to the drawings in detail, FIG. 1 shows a portable electronic device 100, with a battery cover 30 detached therefrom. The portable electronic device 100 includes a main body 10. The main body 10 is substantially rectangular and can be a shell of the portable electronic device 100. The main body 10 includes a back surface 11 defining a battery chamber 12.

The battery chamber 12 is also substantially rectangular and recessed into the back surface 11 of main body 10. The battery chamber 12 includes two parallel first sidewalls 121 and two parallel second sidewalls 122 perpendicular to the two first sidewalls 121. The two first sidewalls 121 and the two second sidewalls 122 define the battery chamber 12 to accommodate a battery (not shown). Each of the two first sidewalls 121 define two rectangular slots 126 adjacent to the back surface 11 of the main body 10. Each second sidewall 122 includes a supporting portion 128 protruding therefrom.

Figure 2:
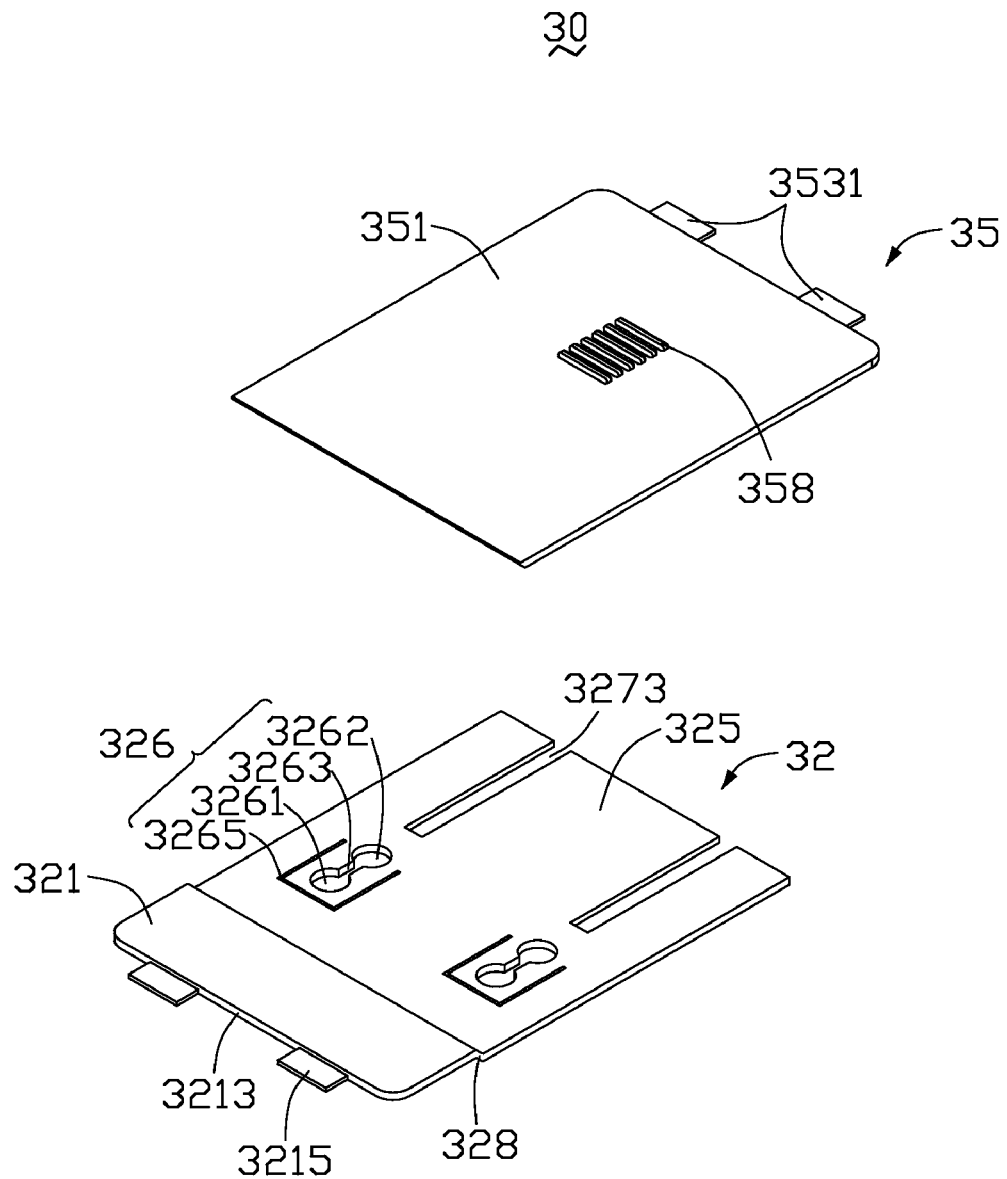
FIG. 2 shows a disassembled schematic view of the battery cover of FIG. 1, the structure including a sliding cover and a main cover.
Figure 3:
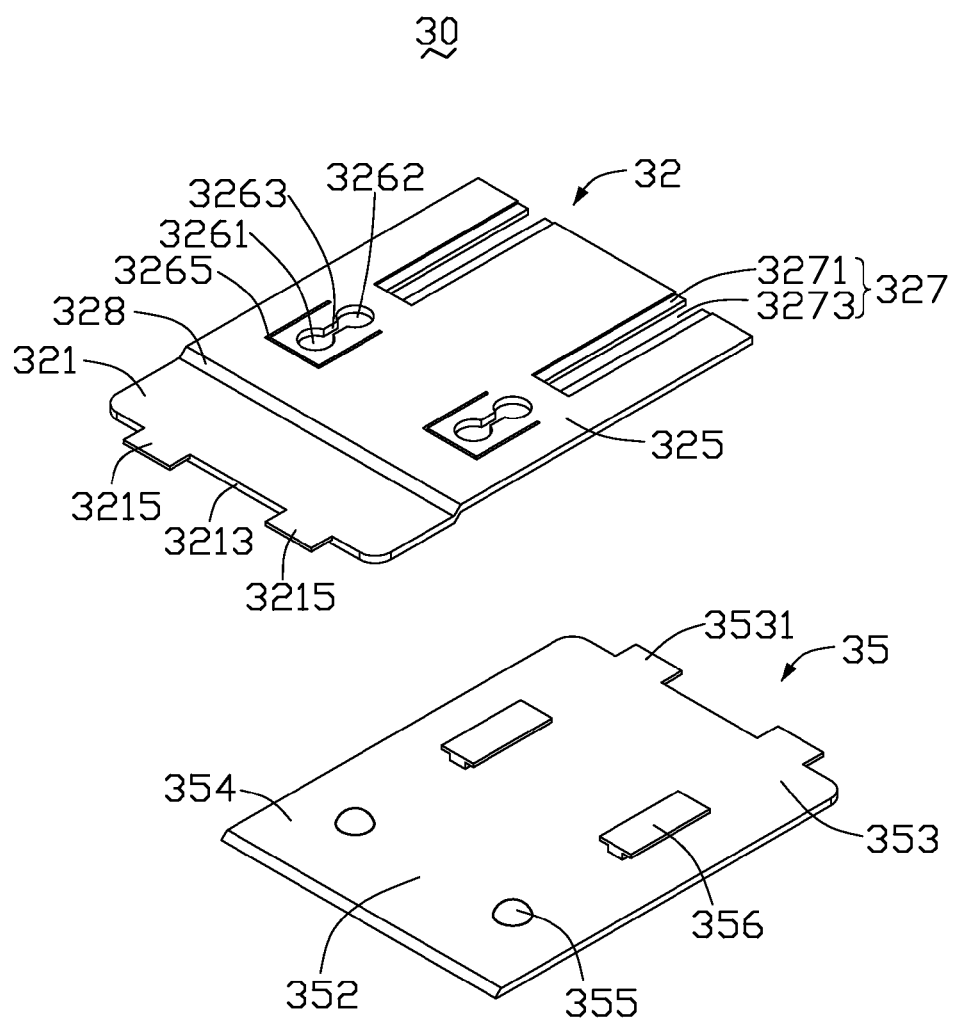
FIG. 3 is similar to FIG. 2, but viewed from another aspect.
Figure 4:
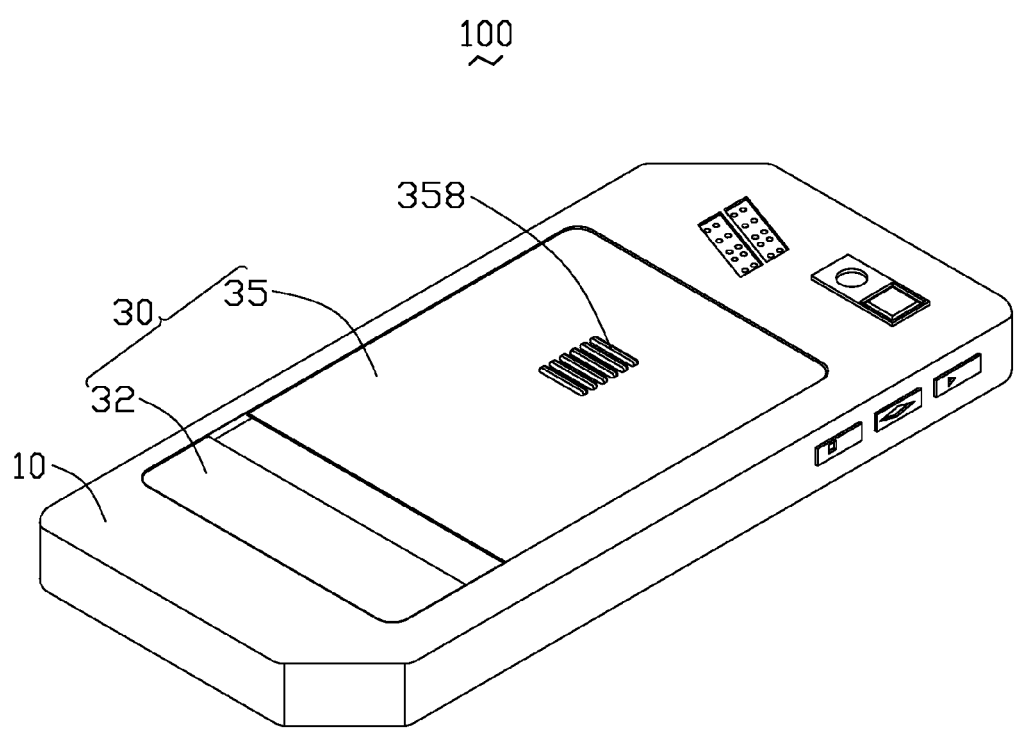
FIG. 4 is a schematic view of the portable electronic device, with a battery cover assembled thereon.

Referring to FIGS. 2 and 3, the battery cover 30 can be made of plastic or rubber material, and includes a main cover 32 and a sliding cover 35 that can be slidably assembled with the main cover 32. The main cover 32 is substantially rectangular, and is bent into a stepped shape near one end thereof. The main cover 32 includes an extending portion 321, a main portion 325 and a connecting portion 328.

The extending portion 321 and the main portion 325 are parallel and connected to each other by the connecting portion 328. In the exemplary embodiment, the connecting portion 328 is a sloping wall. The distance between planes of the extending portion 321 and the main portion 325 is substantially equal to the thickness of the sliding cover 35.

The extending portion 321 includes an end surface 3213 and two spaced tabs 3215 protruding from the end surface 3213 thereof. The two spaced tabs 3215 correspond to and latch with the two slots 126 of one first sidewall 121.

The main portion 325 includes two spaced positioning portions 326 defined therein, and two guiding portions 327 (FIG. 3) respectively aligned with the two positioning portions 326. The two positioning portions 326 are defined near the connecting portion 328. In the exemplary embodiment, two cutouts 3265 are defined in the main portion 325 to form the positioning portions 326. Each positioning portion 326 includes an entry circular hole 3261 communicating with a locking circular hole 3262 by a narrow connecting slot 3263. The width of the connecting slot 3263 is smaller than the diameters of the entry circular hole 3261 and the locking circular hole 3262 to provide a narrow resilient passage between the entry circular hole 3261 and the locking circular hole 3262. The two guiding portions 327 are formed on the main portion 325. In the exemplary embodiment, the two guiding portions 327 are configured as stepped sliding chutes. Each guiding portion 327 includes two grooves 3271 recessed on one surface of the main portion 325 and a notch 3273 defined there between.

The sliding cover 35 is substantially rectangular, and the width of the sliding cover 35 is substantially the same as the width of the main cover 32. The sliding cover 35 is slidably assembled with the main cover 32. The sliding cover 35 includes a top surface 351, a bottom surface 352, a first end 353 and an opposite second end 354. The first end 353 includes two spaced projections 3531 protruding from one end of the sliding cover 35 that correspond to and latch with the two slots 126 of the other first sidewall 121. The bottom surface 352 of the sliding cover 35 forms two spaced positioning blocks 355 and two spaced guiding blocks 356 that correspond to the two positioning portions 326 and the two guiding portions 327 of the main cover 32 respectively. In the exemplary embodiment, the two positioning blocks 355 are substantially hemispherical-shaped and protrude from the bottom surface 352 of the sliding cover 35 near the second end 354. The two guiding blocks 356 are substantially "T" shaped in cross-section and protrude from the bottom surface 352 of the sliding cover 35 near the first end 353. The middle of the top surface 351 of the sliding cover 35 defines an operating portion 358 thereon. The operating portion 358 includes several spaced ribs for convenient operation.

Referring to FIG. 2, FIG. 3, FIG. 5 and FIG. 6, to assemble the sliding cover 35 to the main cover 32, with the main portion 325 held so that the bottom surface 352 of the sliding cover 35 faces the main portion 325 of the main cover 32, and the two positioning blocks 355 are received in the corresponding two locking circular holes 3262, the two guiding blocks 356 are aligned to slide into the two guiding portions 327 of the main cover 32 until the two positioning blocks 355 of the sliding cover 35 slide from the locking holes 3262 to the entry holes 3261. The resilient narrow slots 3263 prevent the positioning blocks 355 from accidentally sliding back to the locking circular holes 3262 and allowing the battery cover to disassemble. Thus, assembly of the battery cover 30 is complete. The sliding cover 35 is substantially coplanar with to the extending portion 321 of the main cover 32, and the first end 353 extends out from the main portion 325.

Figure 5:
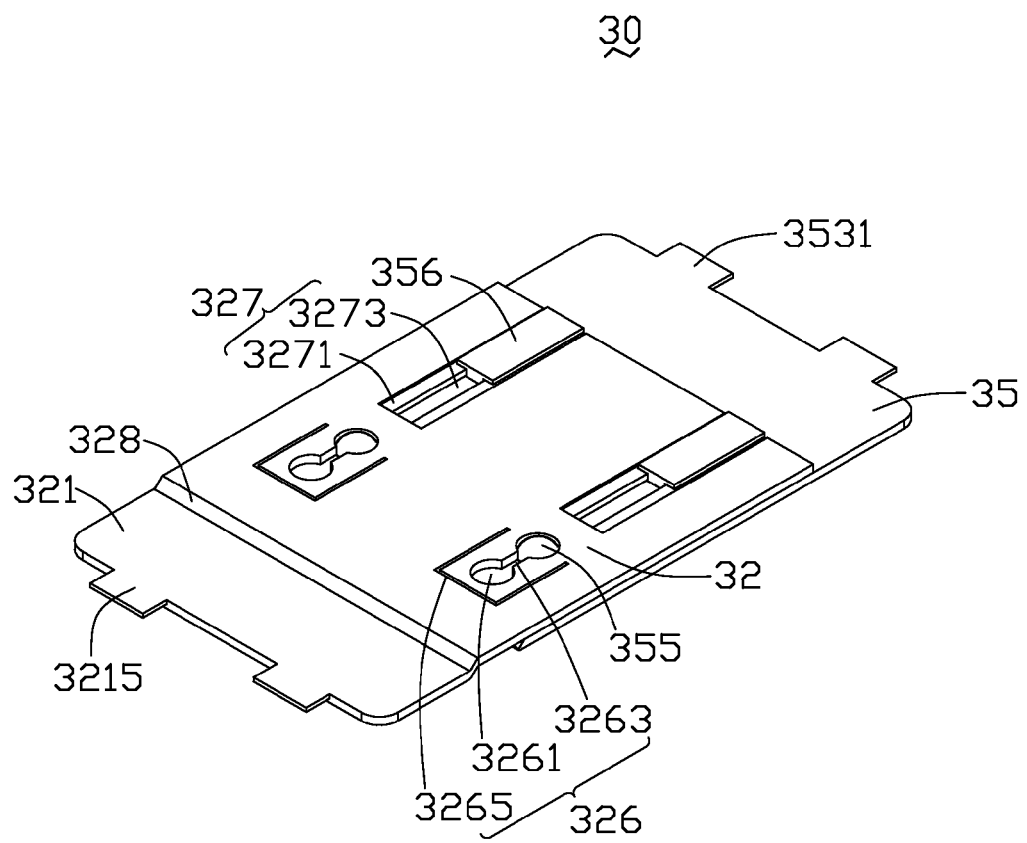
FIG. 5 is similar to FIG. 4, with the sliding cover completely assembled to the main cover.
Figure 6:
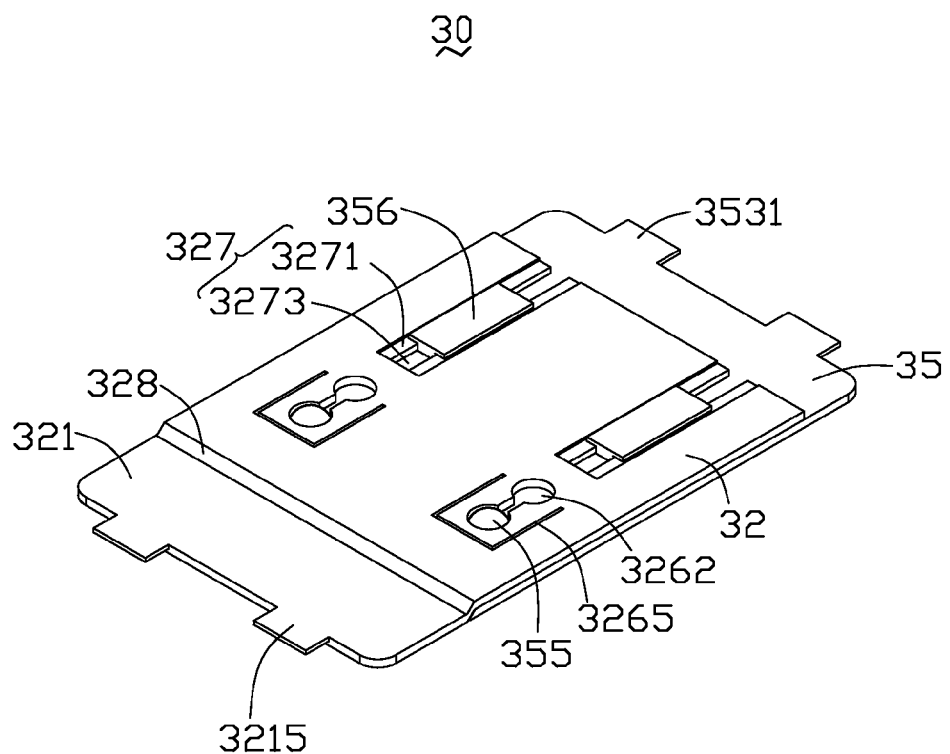
FIG. 6 is similar to FIG. 5, but with the sliding cover partially assembled to the main cover.

Also referring to FIG. 1, FIG. 5 and FIG. 6, when assembling the battery cover 30 to the battery chamber 12 of the main body 10, the two spaced tabs 3215 of the main cover 32 are respectively inserted into the two spaced slots 126 of one first sidewall 121. The two sides of the main portion 325 of the battery cover 30 abut the two supporting portions 128 of the two second sidewalls 122 respectively. The operating portion 358 of the sliding cover 35 is pushed to allow the sliding cover 35 and the main cover 32 to slide until the two projections 3531 of the sliding cover 35 are inserted into the two slots 126 of the other first sidewall 121 respectively.

It is understood that the number of the exemplary tabs 3215, projections 3531 are not just limited to two; the number also can be increased or decreased by the needs. For example, the number of the exemplary tabs 3215, projections 3531 can be one or more than two. The number of the exemplary supporting portion 128 is not just limited to the two, and the number also can be increased or decreased by the needs. The number of the exemplary positioning portion 326 and the guiding portion 327 are not just limited to two, the number also can be increased or decreased by the needs.

It is to be understood, however, that even though numerous characteristics and advantages of the exemplary invention have been set forth in the foregoing description, with details of the structure and function of the exemplary invention, the disclosure is illustrative only, and changes may be made in detail, especially in matters of shape, size, and arrangement of parts within the principles of exemplary invention to the full extent indicated by the broad general meaning of the terms in which the appended claims are expressed.

What is claimed is:

1. A battery cover comprising:
   a main cover comprising an extending portion and a main portion connected to each other, the main portion comprising at least one positioning portion, and the extending portion comprising at least one tab protruding from an end thereof, the at least one positioning portion including two circular holes and a connecting slot communicating with the two circular holes, the positioning portion further defines a cutout in the main portion that partially surrounds the circular holes and the connecting slot; and
   a sliding cover slidably assembled with the main cover, the sliding cover comprising at least one block formed on one surface thereof engaging with the at least one positioning portion of the main portion and at least one projection protruding from one end thereof opposite to the tab, the at least one block being hemispherical and latches with one of the circular holes.

2. The battery cover as claimed in claim 1, wherein the main portion further comprises at least one guiding portion, the sliding cover includes at least one guiding block formed on one surface thereof slidably assembled with the at least one guiding portion of the main cover.

3. The battery cover as claimed in claim 2, wherein the at least one guiding portion includes two grooves recessed on the main portion and a notch defined there between; the guiding block has a "T" shaped cross-section protruding from the sliding cover.

4. The battery cover as claimed in claim 1, wherein the sliding cover defines an operating portion on a surface thereof opposite to the block, the operating portion are several spaced bar ribs protruding from the surface of the sliding cover.

5. The battery cover as claimed in claim 1, wherein the main cover further comprising a connecting portion connecting with the main portion and the extending portion, the connecting portion is a connecting sloping wall and the height between the extending portion and the main portion substantially equals the thickness of the sliding cover.

6. A battery cover comprising:
   a main cover comprising two positioning portions and two tabs, each positioning portion including an entry hole, a locking hole communicating with the entry hole by a narrow connecting slot, and a cutout partially surrounding the entry hole, the locking hole and the connecting slot; and
   a sliding cover slidably assembled with the main cover, the sliding cover comprising two blocks formed on one surface thereof latching with one of the entry hole and the locking hole.

7. The battery cover as claimed in claim 6, wherein the main cover comprising an extending portion and a main portion connected to each other, the positioning portions are formed on the main portion, and the tabs protrude from an end of the extending portion.

8. The battery cover as claimed in claim 7, wherein the main portion further comprises two guiding portions, the sliding cover includes two guiding blocks formed on one surface thereof slidably assembled with the guiding portions of the main cover.

9. The battery cover as claimed in claim 8, wherein each guiding portion includes two grooves recessed on the main portion and a notch defined there between; each guiding block has a "T" shaped cross-section protruding from the sliding cover.

10. A battery cover configured for detachably mounted a main body, the main body having a battery chamber defining at least one first slot and at least one second slot opposite to each other, the battery cover comprising:
    a main cover comprising at least one positioning portion, and at least one tab protruding from one end of the main cover, the at least one positioning portion including an entry hole, a locking hole communicating with the entry hole by a narrow connecting slot; and
    a sliding cover slidably assembled with the main cover, the sliding cover comprising at least one block formed on one surface thereof and at least one projection protruding from one end thereof opposite to the tab, the at least one block engaging with the entry hole;
    wherein the at least one tab of the main cover engages with the at least one first slot, when the sliding cover is slid relative to the main cover along a direction, the at least one block slides in the locking hole from the entry hole through the connecting slot to allow the at least one projection to engage with the at least one second slot for latching the battery cover on the main body;
    when the sliding cover is slid relative to the main cover along a reverse direction, the at least one block slides in the entry hole from the locking hole through the connecting slot to allow the at least one projection to disengage with the at least one second slot for detaching the battery cover from the main body.

11. The battery cover as claimed in claim 10, wherein the main cover comprising an extending portion and a main portion connected to each other, the at least one positioning portion is formed on the main portion, and the at least one tab protrudes from an end of the extending portion, the positioning portion further defines a cutout in the main portion that partially surrounds the entry hole, the locking hole and the connecting slot.

* * * * *